(12) United States Patent
Ogata et al.

(10) Patent No.: US 12,432,454 B2
(45) Date of Patent: Sep. 30, 2025

(54) IMAGE CAPTURE APPARATUS AND IMAGE CAPTURE METHOD

(71) Applicant: NIKON CORPORATION, Tokyo (JP)

(72) Inventors: Masashi Ogata, Tokyo (JP); Shigeru Doida, Kawasaki (JP); Erika Koishi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 301 days.

(21) Appl. No.: 18/037,794

(22) PCT Filed: Nov. 18, 2021

(86) PCT No.: PCT/JP2021/042488
§ 371 (c)(1),
(2) Date: Jul. 24, 2023

(87) PCT Pub. No.: WO2022/107860
PCT Pub. Date: May 27, 2022

(65) Prior Publication Data
US 2023/0403467 A1    Dec. 14, 2023

(30) Foreign Application Priority Data

Nov. 20, 2020  (JP) .................................. 2020-193394

(51) Int. Cl.
*H04N 23/68* (2023.01)
*H04N 5/265* (2006.01)
(Continued)

(52) U.S. Cl.
CPC ........... *H04N 23/687* (2023.01); *H04N 5/265* (2013.01); *H04N 23/667* (2023.01); *H04N 25/53* (2023.01); *H04N 25/60* (2023.01)

(58) Field of Classification Search
CPC .... H04N 23/687; H04N 23/667; H04N 23/73; H04N 25/60; H04N 25/53; H04N 5/265
(Continued)

(56) References Cited

U.S. PATENT DOCUMENTS

| | | | | |
|---|---|---|---|---|
| 6,108,036 A * | 8/2000 | Harada | ................ | H04N 23/58 348/219.1 |
| 8,345,108 B2 * | 1/2013 | Kobayashi | ............. | H04N 25/44 348/208.1 |

(Continued)

FOREIGN PATENT DOCUMENTS

| JP | 2006-197192 A | 7/2006 |
|---|---|---|
| JP | 2009-033607 A | 2/2009 |

(Continued)

OTHER PUBLICATIONS

Feb. 1, 2022 International Search Report issued in International Patent Application No. PCT/JP2021/042488.

*Primary Examiner* — Pritham D Prabhakher
(74) *Attorney, Agent, or Firm* — Oliff PLC

(57) ABSTRACT

An image capturing apparatus including: an image capturing device that has a plurality of pixels outputting pixel signals according to incident light, the plurality of pixels being divided into a plurality of blocks each including at least two pixels, and an exposure condition being set for each block; an image capture control unit that changes a light receiving position on the image capturing device, based on an exposure condition set for an adjacent block; and an image processing unit that synthesizes a plurality of images which are generated at a plurality of the light receiving positions.

20 Claims, 16 Drawing Sheets

(51) Int. Cl.
*H04N 23/667* (2023.01)
*H04N 25/53* (2023.01)
*H04N 25/60* (2023.01)

(58) Field of Classification Search
USPC .................................................. 348/208.16
See application file for complete search history.

(56) References Cited

U.S. PATENT DOCUMENTS

| | | | | |
|---|---|---|---|---|
| 9,210,334 | B2* | 12/2015 | Toyoda | H04N 23/10 |
| 10,638,037 | B2* | 4/2020 | Shionoya | H04N 23/80 |
| 11,032,470 | B2* | 6/2021 | Burstein | H04N 25/48 |
| 11,095,830 | B2* | 8/2021 | Shionoya | H04N 25/533 |
| 11,245,857 | B2* | 2/2022 | Sasaki | H04N 23/73 |
| 11,532,143 | B2* | 12/2022 | Seo | H04N 23/667 |
| 2007/0159535 | A1* | 7/2007 | Kumagai | H04N 23/58 |
| | | | | 348/E9.01 |
| 2008/0284871 | A1 | 11/2008 | Kobayashi | |
| 2011/0211097 | A1* | 9/2011 | Omori | H04N 23/45 |
| | | | | 348/E5.048 |
| 2014/0125863 | A1* | 5/2014 | Toyoda | H04N 23/741 |
| | | | | 348/362 |
| 2014/0184883 | A1* | 7/2014 | Shimamoto | H04N 23/70 |
| | | | | 348/345 |
| 2017/0264364 | A1* | 9/2017 | Aoyama | H04B 10/1141 |
| 2018/0288316 | A1* | 10/2018 | Shionoya | H04N 23/80 |
| 2019/0068866 | A1 | 2/2019 | Sasaki | |
| 2019/0222752 | A1* | 7/2019 | Burstein | H04N 5/2224 |
| 2020/0228705 | A1* | 7/2020 | Shionoya | G06T 3/4015 |
| 2020/0410272 | A1* | 12/2020 | Seo | G06T 7/70 |

FOREIGN PATENT DOCUMENTS

| | | |
|---|---|---|
| JP | 2009-038479 A | 2/2009 |
| JP | 2015-062297 A | 4/2015 |
| JP | 2019-047169 A | 3/2019 |

* cited by examiner

IMAGE CAPTURE APPARATUS AND IMAGE CAPTURE METHOD

BACKGROUND

1. Technical Field

The present invention relates to an image capturing apparatus and an image capturing method.

2. Related Art

Patent document 1 discloses an image capturing apparatus in which one screen image is divided into a plurality of blocks, and a motion is detected for each of the blocks to control an exposure time of the block.

PRIOR ART DOCUMENT

Patent Document

Patent Document 1: Japanese Patent Application Publication No. 2006-197192

A first aspect of the present invention provides an image capturing apparatus. The image capturing apparatus includes an image capturing device that has a plurality of pixels outputting pixel signals according to incident light, the plurality of pixels being divided into a plurality of blocks each including at least two pixels, and an exposure condition being set for each block; an image capture control unit that changes a light receiving position on the image capturing device, based on an exposure condition set for an adjacent block; and an image processing unit that synthesizes a plurality of images which are generated at a plurality of the light receiving positions.

A second aspect of the present invention provides an image capturing method that uses an image capturing device that has a plurality of pixels outputting pixel signals according to incident light, the plurality of pixels being divided into a plurality of blocks each including at least two pixels, and an exposure condition being set for each block. The image capturing method includes changing a light receiving position on the image capturing device, based on an exposure condition set for an adjacent block; and synthesizing a plurality of images which are generated at a plurality of the light receiving positions.

The summary clause does not necessarily describe all necessary features of the embodiments of the present invention. The invention may also include a sub-combination of the features described above.

DESCRIPTION OF EXEMPLARY EMBODIMENTS

Hereinafter, the present invention will be described through embodiments of the present invention, but the following embodiments do not limit the present invention according to claims. In addition, not all of the combinations of features described in the embodiments are essential to the solving means of the invention.

Figure 1:
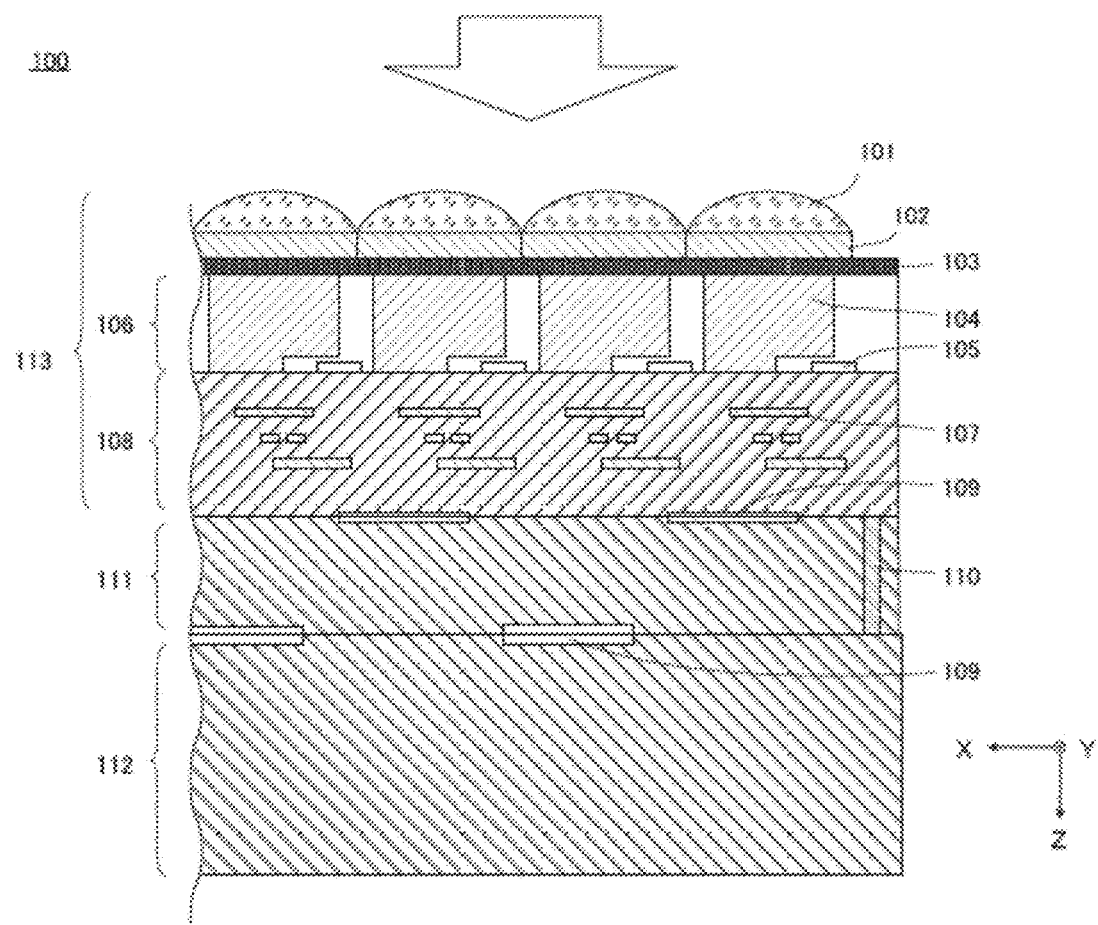
FIG. 1 is a cross-sectional view of an image capturing device 100 according to the present embodiment.

FIG. 1 is a cross-sectional view of an image capturing device 100 according to the present embodiment. The image capturing device 100 includes an image capturing chip 113 that outputs a pixel signal corresponding to incident light, a signal processing chip 111 that processes the pixel signal, and a memory chip 112 that stores the pixel signal. The image capturing chip 113, the signal processing chip 111, and the memory chip 112 are stacked, and are electrically connected with each other by a bump 109 that is a connection unit of Cu or the like and that is electrically conductive.

It should be noted that as shown in the figure, the incident light is incident mainly in a Z axis plus direction indicated by an outline arrow. In the present embodiment, in the image capturing chip 113, a surface of a side on which the incident light is incident is referred to as a back surface. In addition, as shown in coordinate axes, a left direction of a paper surface orthogonal to a Z axis is set as an X axis plus direction, and a front direction of the paper surface orthogonal to the Z axis and an X axis is set as a Y axis plus direction. In several of the following drawings, the coordinate axes of FIG. 1 are used as the reference to display the orientation of each drawing.

An example of the image capturing chip 113 is a backside irradiation-type MOS image sensor. A PD layer 106 is disposed on a back surface side of a wiring layer 108. The PD layer 106 has a plurality of PDs (photodiodes) 104 disposed two-dimensionally, and transistors 105 provided corresponding to the PDs 104.

A side of the PD layer 106 on which the incident light is incident is provided with a color filter 102 via a passivation film 103. There are a plurality of types of the color filters 102 that allow passage of light of mutually different wavelength regions, and the color filters 102 are arrayed in specific manners corresponding to the respective PDs 104. The array of the color filters 102 will be described below. A set of the color filter 102, the PD 104, and the transistor 105 forms one pixel.

A side of the color filter 102 on which the incident light is incident is provided with a microlens 101 corresponding to each pixel. The microlens 101 concentrates the incident light towards the corresponding PD 104.

The wiring layer 108 has wiring 107 that transmits the pixel signal from the PD layer 106 to the signal processing chip 111. The wiring 107 may be formed by multiple layers, and may be provided with a passive element and an active element.

A plurality of bumps 109 that are connection units are disposed on a front surface of the wiring layer 108. By aligning and bonding the plurality of bumps 109 to the plurality of bumps 109 provided on a facing surface of the signal processing chip 111, the image capturing chip 113 and the signal processing chip 111 are electrically connected to each other.

Similarly, the plurality of bumps 109 that are the connection units are disposed on mutually facing surfaces of the signal processing chip 111 and the memory chip 112. By aligning and bonding these bumps 109 to each other, the signal processing chip 111 and the memory chip 112 are electrically connected to each other.

It should be noted that the image capturing device 100 is formed by performing bonding on a wafer in a state before the image capturing chip 113, the signal processing chip 111, and the memory chip 112 are formed as chips, and performing dicing on the bonded wafer.

When the wafers are bonded together, front surfaces of the wafers are irradiated with plasma by an activation apparatus to activate the bonding surfaces of the wafers. The wafers in which the front surfaces are activated, are bonded by a hydrogen bond which is generated by a contact, a van der Waals bond, a covalent bond, and the like, and a stacked substrate is formed. When two wafers are in contact with each other and form hydrogen bonds, by forming the stacked substrate, and then loading the stacked substrate into a heating apparatus such as an annealing furnace and heating the stacked substrate, the covalent bond is generated between the wafers.

It should be noted that when the bonding surface of the wafer is in contact with the bonding surface of another wafer, the activation includes a case of processing the bonding surface of at least one substrate to generate the hydrogen bond, the Van der Waals bond, the covalent bond, and the like for a state of a solid phase bonding without melting. That is, the activation includes making it easy to form the bond by generating a dangling bond (an unpaired bond) on the front surface of the wafer.

More specifically, the activation apparatus excites, for example, an oxygen gas which is a processing gas into the plasma under a reduced pressure atmosphere, and radiates oxygen ions to the front surfaces respectively serving as the bonding surfaces of the two substrates. For example, when the wafer is a substrate in which a SiO film is formed on Si, the radiation of the oxygen ion cuts a bond of SiO on the front surface of the wafer serving as the bonding surface at a time of the stacking, and the dangling bonds of Si and O are formed. A formation of such a dangling bond on the front surface of the wafer may be referred to as the activation.

When the substrate in a state in which the dangling bond is formed is exposed to the atmosphere, for example, moisture in the air is bound to the dangling bond, and the front surface of the substrate is covered with a hydroxyl group (an OH group). The front surface of the substrate is brought into a state of being easily bound to a water molecule, that is, a state of being easily hydrophilic. That is, the activation causes a state in which the front surface of the substrate is easily hydrophilic as a result. In addition, in the solid phase bonding, a presence of an impurity such as an oxide at a bonding interface, a defect at the bonding interface, or the like affects a bonding strength. Thereby, cleaning the bonding surfaces may be regarded as a part of the activation.

Further, in the activation of the wafer, the front surface of the wafer may become hydrophilic, by using a hydrophilization apparatus (not shown) to apply pure water or the like to the front surface serving as the bonding surface of the wafer. By this hydrophilization, the front surface of the wafer is brought into a state in which the OH group is attached, that is, a state of being terminated with the OH group.

By a heating process of the stacked substrate, the bumps 109 respectively provided on the bonding surfaces of the two wafers are integrated with each other to form the electrical connection between the wafers. For example, by the bumps 109 being formed of a material which melts at a low temperature, such as indium or a tin-silver alloy, it is possible to perform a reflow process on the stacked substrate at a low temperature of 200 degrees or less. Alternatively, when the bumps 109 are formed of electrically conductive metal such as copper, the bumps 109 between the wafers are pressed against and bonded to each other by expansions due to the heating process, and are bonded by a solid phase diffusion.

It should be noted that the bumps 109 may be bonded with each other not only by Cu bump bonding by the solid phase diffusion, but also by micro bump bonding by solder melting. In addition, for example, about one bump 109 may be provided to one pixel block described below. Accordingly, a size of the bump 109 may be greater than a pitch of the PD 104. In addition, in a peripheral region other than a pixel region in which pixels are arrayed, bumps greater than the bumps 109 corresponding to the pixel region may be provided together.

The signal processing chip 111 has a TSV (a through-silicon via) 110 connecting, with each other, circuits respectively provided to front and back surfaces. The TSV 110 is preferably provided to the peripheral region. In addition, the TSV 110 may also be provided to a peripheral region of the image capturing chip 113, and the memory chip 112. In addition, the TSV 110 may be used to electrically connect a circuit provided in the memory chip 112 and a circuit provided in the image capturing chip 113.

In this way, the image capturing chip 113 and the signal processing chip 111 are bonded by the respective facing surfaces and the bumps 109. In addition, the signal processing chip 111 and the memory chip 112 are bonded to each other on the respective facing surfaces, and are connected to each other by the bump 109 and the TSV 110 provided in the signal processing chip 111. It should be noted that the signal processing chip 111 and the memory chip 112 may be bonded to each other on the respective facing surfaces, and may be connected to each other by at least one of the bump 109 or the TSV 110.

Figure 2:
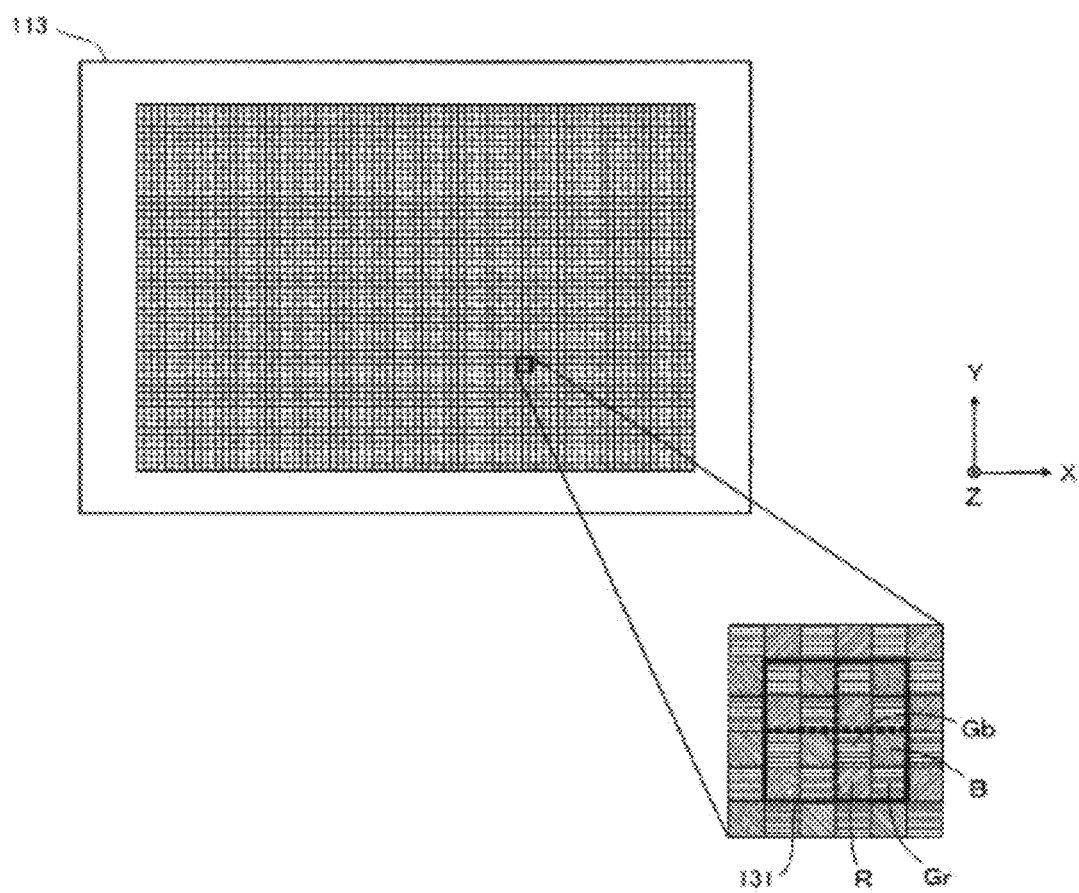
FIG. 2 is a diagram describing a pixel array and a block 131 of an image capturing chip 113.

FIG. 2 is a diagram describing a pixel array and a block 131 of an image capturing chip 113. In particular, a state in which the image capturing chip 113 is observed from a back surface side is shown. In the pixel region, up to 20 million or more pixels are arrayed in a matrix shape. These pixels are divided into blocks including at least two pixels. In the present embodiment, 16 pixels of 4 pixels×4 pixels which are adjacent to each other form one block. A grid lines in the figure shows a concept that the adjacent pixels collectively form the block 131.

As shown in a partially enlarged view of the pixel region, the block 131 has vertically and horizontally four so-called Bayer arrays in which total four pixels of green pixels Gb, Gr, a blue pixel B, and a red pixel R are respectively included. The green pixel is a pixel having a green filter as the color filter 102, and receives light in a green wavelength band in the incident light. Similarly, a blue pixel is a pixel having a blue filter as the color filter 102, and receives light in a blue wavelength band, and a red pixel is a pixel having a red filter as the color filter 102, and receives light in a red wavelength band.

Figure 3:
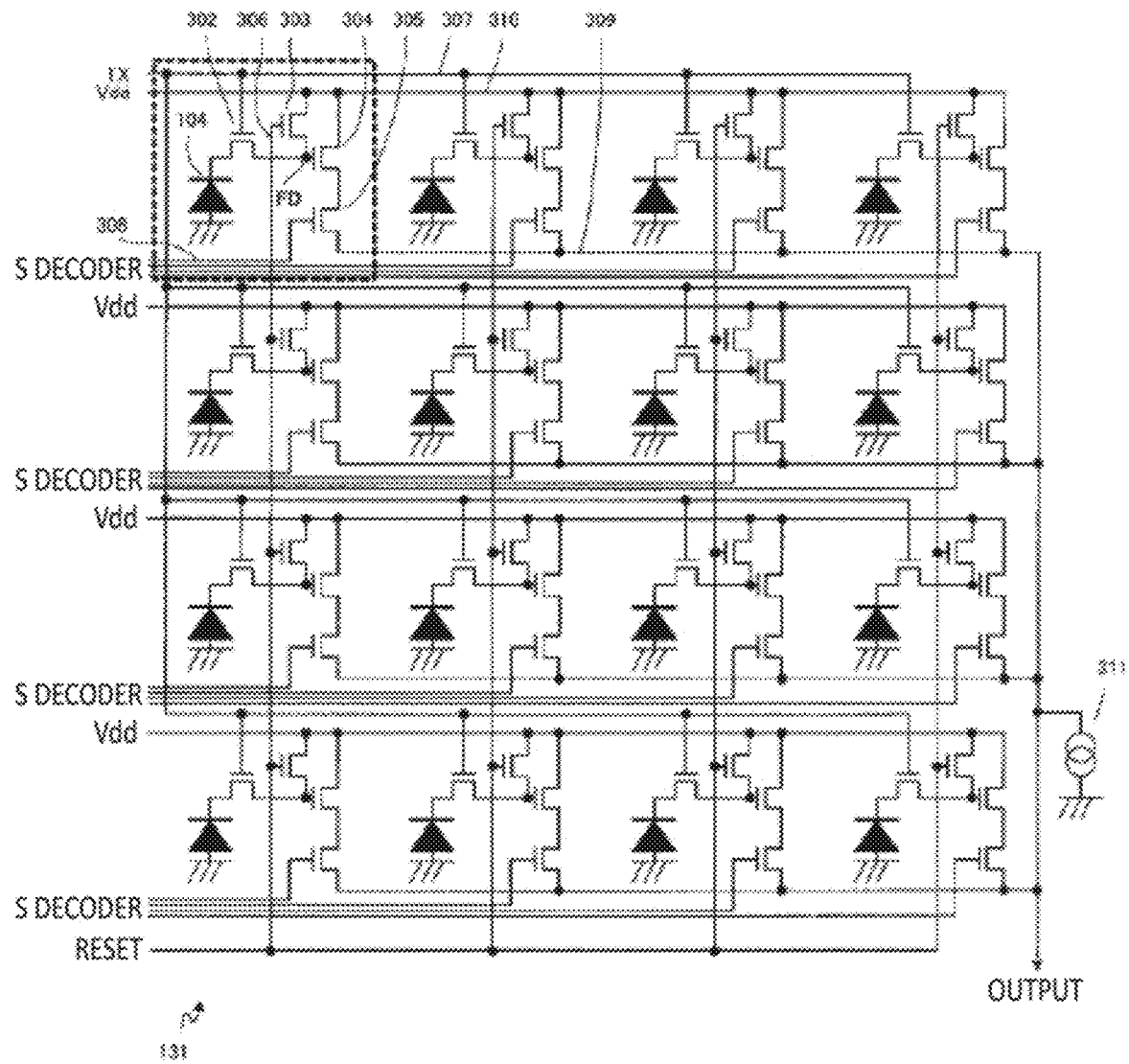
FIG. 3 is a circuit diagram corresponding to the block 131 of the image capturing chip 113.

FIG. 3 is a circuit diagram corresponding to the block 131 of the image capturing chip 113. In the figure, a rectangle surrounded by a dotted line typically represents a circuit corresponding to one pixel. It should be noted that at least a part of each transistor described below corresponds to the transistor 105 in FIG. 1.

As mentioned above, the block 131 is formed of 16 pixels. Each of the 16 PDs 104 corresponding to the respective pixels is connected to a transfer transistor 302, and a gate of each transfer transistor 302 is connected to a TX wiring 307 to which a transfer pulse is supplied. In the present embodiment, the TX wiring 307 is commonly connected to 16 transfer transistors 302.

A drain of each transfer transistor 302 is connected to a source of each corresponding reset transistor 303, and a so-called floating diffusion FD between the drain of the transfer transistor 302 and the source of the reset transistor 303 is connected to the gate of an amplification transistor 304. The reset transistor 303 has the drain connected to Vdd wiring 310 to which a power supply voltage is supplied, and the gate connected to a reset wiring 306 to which a reset pulse is supplied. In the present embodiment, the reset wiring 306 is commonly connected to the 16 reset transistors 303.

The drain of each amplification transistor 304 is connected to the Vdd wiring 310 to which the power supply voltage is supplied. In addition, the source of each amplification transistor 304 is connected to the drain of each corresponding selection transistor 305. Each gate of the selection transistor is connected to decoder wiring 308 to which a selection pulse is supplied. In the present embodiment, the decoder wiring 308 is provided independently for each of the 16 selection transistors 305. The source of each selection transistor 305 is connected to output wiring 309 in common. A load current source 311 supplies a current to the output wiring 309. That is, the output wiring 309 for the selection transistor 305 is formed by a source follower. It should be noted that the load current source 311 may be provided on an image capturing chip 113 side, or may be provided on a signal processing chip 111 side.

Here, a flow from a start of an exposure of the pixel, to an output of the pixel signal after an end of the exposure will be described. When the reset pulse is applied to the reset transistor 303 through the reset wiring 306, and the transfer pulse is applied to the transfer transistor 302 through the TX wiring 307 at the same time, potentials of the PD 104 and the floating diffusion FD are reset to start the exposure.

When the application of the transfer pulse is released, the PD 104 converts the received incident light into an electric charge and accumulates the electric charge. After that, when the transfer pulse is applied again in a state in which the reset pulse is not applied, the exposure ends. The electric charges accumulated until the end of the exposure are transferred to the floating diffusion FD, and the potential of the floating diffusion FD becomes a signal potential after the end of exposure from a reset potential. Then, when the selection pulse is applied to the selection transistor 305 through the decoder wiring 308, a variation in the signal potential of the floating diffusion FD is transmitted to the output wiring 309 via the amplification transistor 304 and the selection transistor 305. In this manner, the pixel signal corresponding to the reset potential and the signal potential is output from a unit pixel to the output wiring 309.

As shown in the figure, in the present embodiment, the reset wiring 306 and the TX wiring 307 are common to the 16 pixels forming the block 131. That is, the reset pulse and the transfer pulse are respectively applied to all of the 16 pixels at the same time. Accordingly, all the pixels forming the block 131 start the exposures at the same timing and ends the exposures at the same timing. Note that the pixel signals corresponding to the accumulated electric charges are selectively output to the output wiring 309 by the selection pulses being sequentially applied to the respective selection transistors 305.

In this way, by configuring the circuit with the block 131 as a reference, it is possible to control an exposure time for each block 131. It is possible to control the exposure time for each block, and thus in the blocks 131 which are adjacent to each other, it is possible to output the pixel signals with exposure times different from each other. Further, it is also possible to perform a control in which a common exposure time is set for all the blocks 131, and for a certain block 131, the exposure and the pixel signal output for one time is executed, and for the adjacent block 131, the exposures and the pixel signal outputs for two times are repeated. A repetitive control of the exposure and the pixel signal output in a common unit time, such as the latter, is referred to as a unit time control. It should be noted that in a case where the unit time control is performed and the start time and the end time of the exposure are synchronized in all the blocks 131, the reset wiring 306 may be commonly connected to all the reset transistors 303 on the image capturing chip 113.

Figure 4:
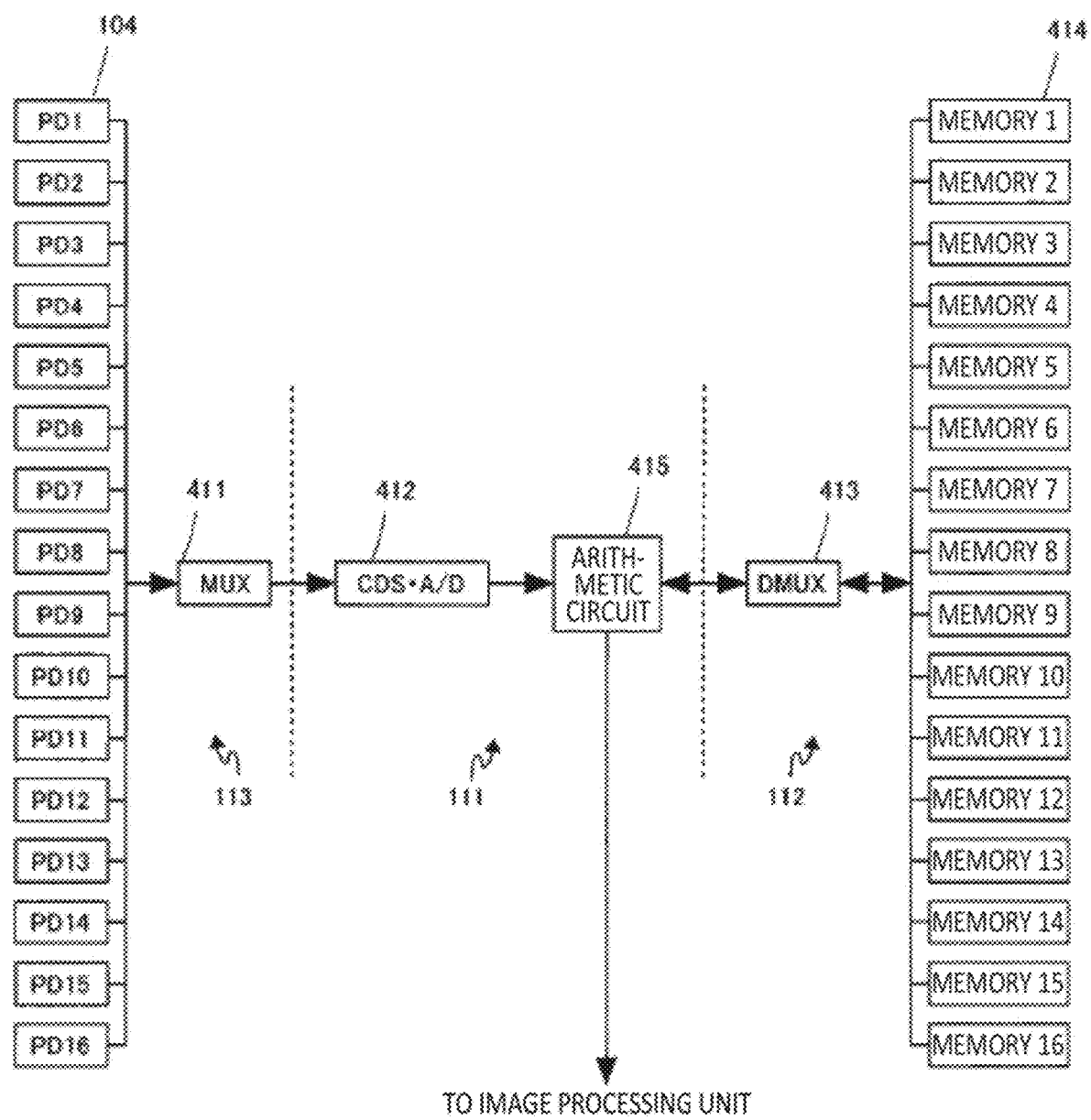
FIG. 4 is a block diagram showing a functional configuration of the image capturing device 100.

FIG. 4 is a block diagram showing a functional configuration of the image capturing device 100. Here, in particular, the flow of the pixel signal will be described.

A multiplexer 411 that is analog selects, in order, the 16 PDs 104 forming the block 131, and causes each pixel signal to be output to the output wiring 309. The multiplexer 411 is formed in the image capturing chip 113 together with the PD 104.

On the pixel signal output via the multiplexer 411, by a signal processing circuit 412 that is formed in the signal processing chip 111 and that performs correlated double sampling (CDS) and analog and digital (A/D) conversion, the CDS and the A/D conversion is performed. In the A/D conversion, an analog pixel signal which is input, is converted into a 12-bit digital pixel signal. The pixel signal obtained by the A/D conversion is delivered to an arithmetic circuit 415 formed in the signal processing chip 111 in the same manner. The arithmetic circuit 415 performs arithmetic processing which is necessary for image processing on the received pixel signal in a later stage, and delivers the pixel signal to a demultiplexer 413.

The demultiplexer 413 stores the received pixel signal in a pixel memory 414 corresponding to each pixel. Each of the pixel memories 414 has a capacity by which it is possible to store the pixel signal after the arithmetic processing is executed. The demultiplexer 413 and pixel memory 414 are formed in the memory chip 112.

The arithmetic circuit 415 reads the pixel signal which is used for the arithmetic processing, from the pixel memory 414 via the demultiplexer 413. Alternatively, according to a delivery request from an outside, the pixel signal read from the pixel memory 414 via the demultiplexer 413 is delivered to an image processing unit in a later stage. It should be noted that the arithmetic circuit 415 may be provided in the memory chip 112.

In addition, in the figure, the flow of the pixel signal for one block; however, in reality, these exist for each block and are operated in parallel. Note that the arithmetic circuit 415 may not exist for each block, and for example, one arithmetic circuit 415 may refer to a value of the pixel memory 414 corresponding to each block, in order, and perform the processing sequentially.

Figure 5:
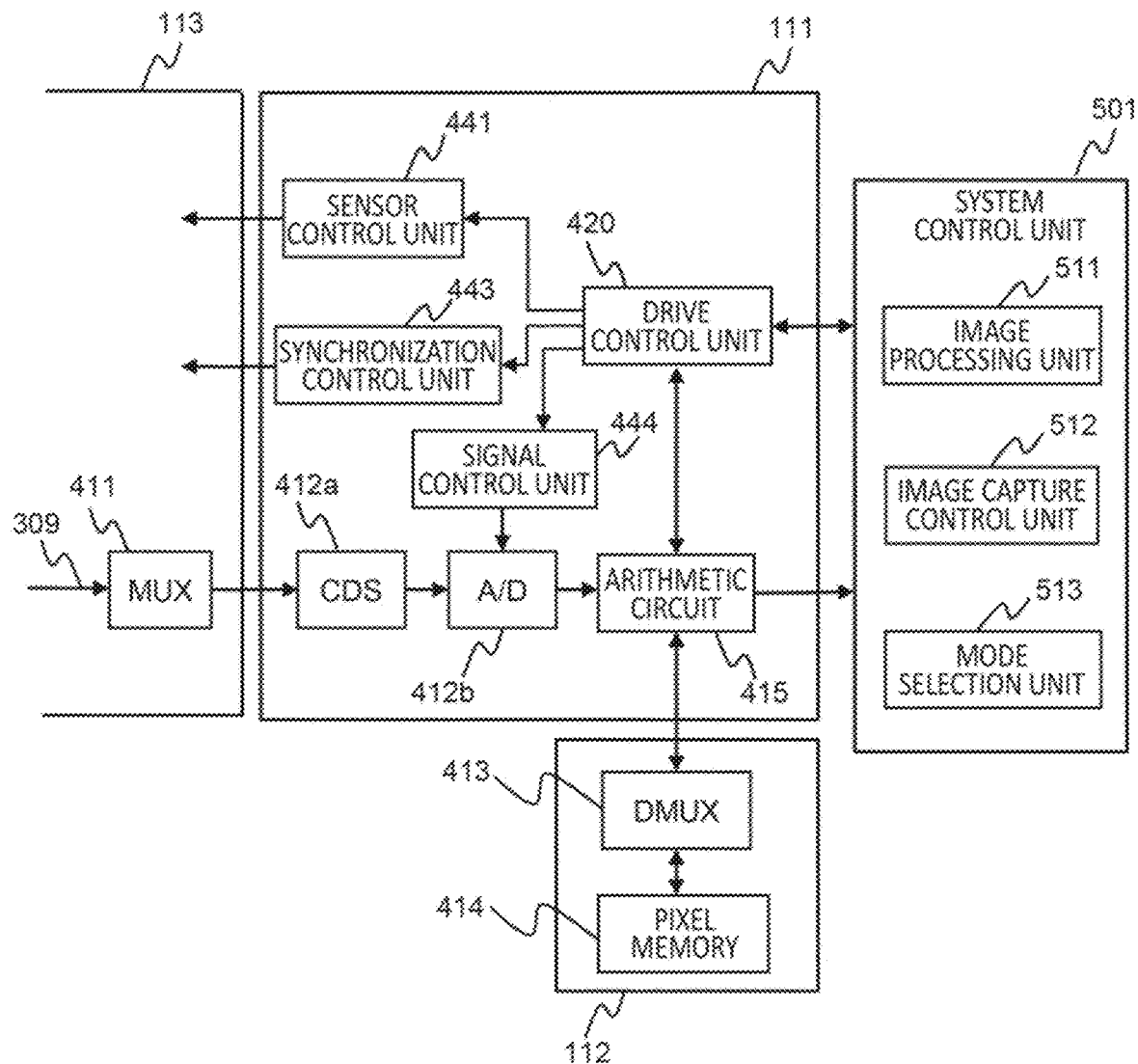
FIG. 5 is a block diagram showing the functional configuration of the image capturing device 100.

FIG. 5 is a block diagram showing the functional configuration of the image capturing device 100. Here, a specific configuration of the signal processing chip 111 and a control by a system control unit 501 will be mainly described.

The signal processing chip 111 includes a sensor control unit 441, a synchronization control unit 443, a signal control unit 444 for shared control functions, and a drive control unit 420 that controls these respective control units in an integrated manner. The drive control unit 420 is a control circuit that converts an instruction from the system control unit 501 responsible for an integrated control of the entire image capturing apparatus, into a control signal that is able to be executed by each control unit, and delivers the control signal to each control unit.

The sensor control unit 441 is responsible for controlling the sending of control pulses which are sent to the image capturing chip 113, and which relate to the accumulation of the electric charge and the reading of the electric charge of each pixel. Specifically, the sensor control unit 441 controls the start and the end of the exposure by sending the reset pulse and the transfer pulse to a target pixel, and outputs the pixel signal to the output wiring 309 by sending the selection pulse to the read pixel.

The synchronization control unit 443 sends a synchronization signal to the image capturing chip 113. Each pulse becomes active in the image capturing chip 113 in synchronization with the synchronization signal. For example, by adjusting the synchronization signal, a random control in which only a specific pixel among the pixels belonging to the same block 131, is set as a control target, thinning out control, or the like is realized.

The signal control unit 444 is mainly responsible for a timing control of an A/D converter 412b. The pixel signal output via the output wiring 309 is input via the multiplexer 411 to a CDS circuit 412a and the A/D converter 412b. The A/D converter 412b is controlled by the signal control unit 444 to convert the input pixel signal into a digital signal. The pixel signal converted into the digital signal is delivered to the arithmetic circuit 415, and the arithmetic processing is performed. The pixel signal on which the arithmetic processing has been performed is delivered to the demultiplexer 413 of the memory chip 112, and is stored as a pixel value of digital data in the pixel memory 414 corresponding to each pixel.

The system control unit 501 of the image capturing apparatus 500 that will be described below is responsible for a function as an image capture instruction unit that receives an instruction from a user and generates an image capture instruction which is transmitted to the image capturing device 100. The drive control unit 420 receives an exposure condition set for each block 131, from an image capture control unit 512 of the system control unit 501. The exposure condition is a condition for changing brightness of an image which is acquired, and is, for example, the exposure time, an aperture value, ISO sensitivity, or the like. The drive control unit 420 sends the control signal to the sensor control unit 441 according to the exposure condition for each block 131.

The drive control unit 420 reads the target pixel signal from the pixel memory 414 via the arithmetic circuit 415 and the demultiplexer 413 according to the delivery request from the image capture control unit 512, and delivers the target pixel signal to an image processing unit 511 of the system control unit 501. The pixel memory 414 is provided with a data transfer interface for transmitting the pixel signal according to the delivery request. The data transfer interface is connected to a data transfer line which is linked to the image processing unit 511. The data transfer line is constituted, for example, by a data bus among bus lines. In this case, the delivery request from the system control unit 501 to the drive control unit 420 is executed by an addressing scheme in which an address bus is used.

The transmission of the pixel signal by the data transfer interface is not limited to the addressing scheme, and various methods may be adopted. For example, a double data rate system may be adopted to perform the processing, when the data transfer is performed, by using both of rising and falling of a clock signal which is used for the synchronization of each circuit. In addition, a burst transfer mode may be adopted to transfer data at once by partially omitting a procedure such as the addressing, thereby achieving an increase in speed. It is also possible to adopt, in combination with each other, a bus method using a line in which a control unit, a memory unit, and an input and output unit are connected in parallel; a serial method transferring the data serially bit by bit; and others.

With the configuration in this way, the image processing unit 511 can receive only the necessary pixel signal, and thus it is possible to complete the image processing at a high speed especially when an image of a low resolution is formed, or the like.

Figure 6:
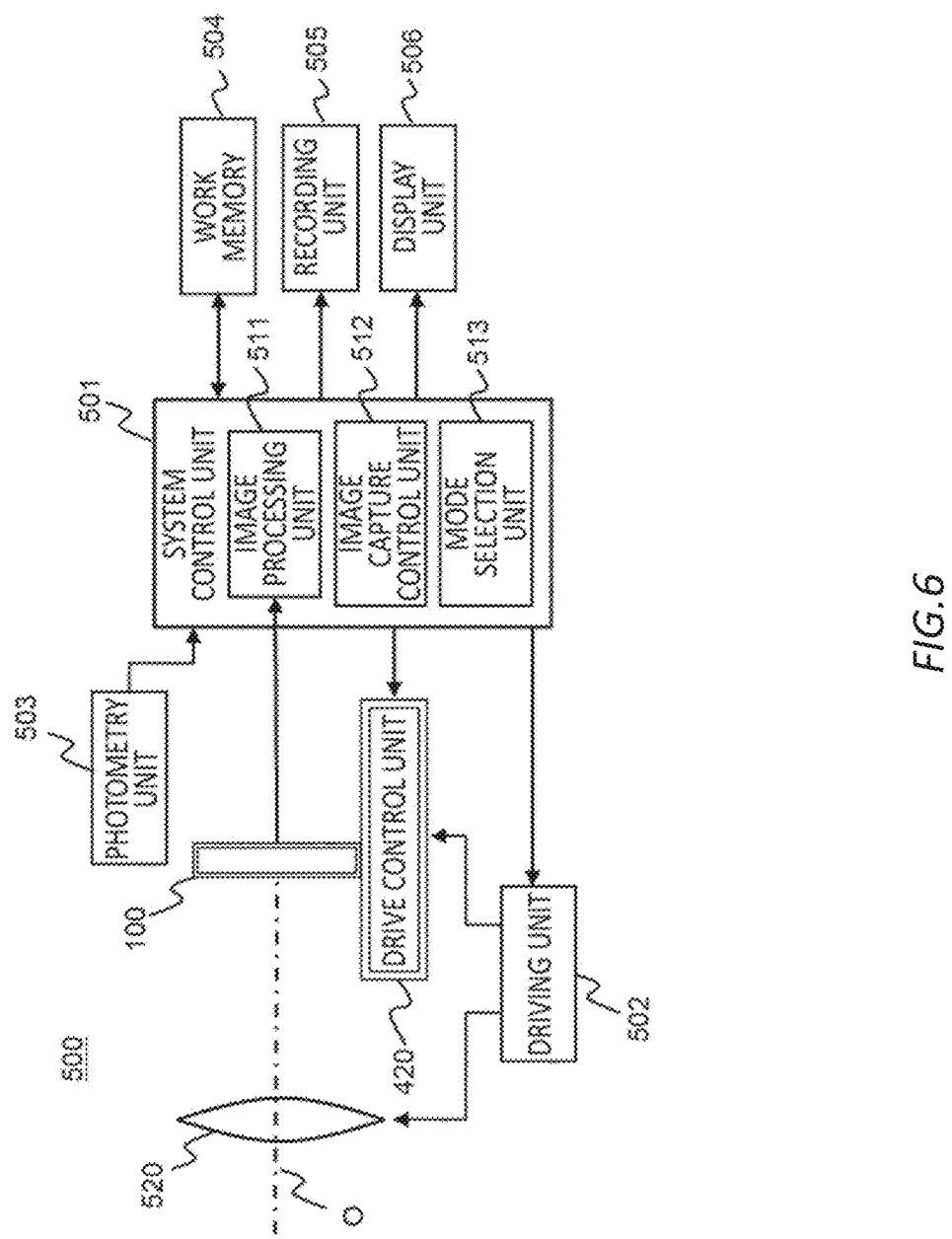
FIG. 6 is a block diagram showing a configuration of an image capturing apparatus 500 according to the present embodiment.

FIG. 6 is a block diagram showing a configuration of an image capturing apparatus 500 according to the present embodiment. The image capturing apparatus 500 mainly includes the image capturing device 100, a photographing lens 520, the system control unit 501, a driving unit 502, a photometry unit 503, a work memory 504, a recording unit 505, and a display unit 506.

The driving unit 502 drives the image capturing device 100 and the photographing lens 520. The driving refers to moving a drive target, on an xy plane where the drive target is positioned at a start of the image capture. The driving unit 502 is, for example, an actuator such as a motor or a piezoelectric element. A driving direction by the driving unit 502 is not limited to the xy plane, and for example, the image capturing device 100 may be rotationally driven in a rotational direction about the z axis.

The photometry unit 503 detects a luminance distribution of a scene prior to a series of photographing sequences for generating image data. The photometry unit 503 includes, for example, an AE sensor with approximately one million pixels.

The photographing lens 520 guides photographic subject-emanating light flux which is incident along an optical axis O to the image capturing device 100. The photographing lens 520 is an example of an optical system. The photographing lens 520 includes a plurality of optical lens groups, and forms an image of the photographic subject-emanating light flux from the scene, in a vicinity of a focal plane of the photographing lens. It should be noted that in FIG. 6, the photographing lens 520 is represented by a single virtual lens disposed near a pupil. The photographing lens 520 may be a replaceable lens that can be attached and detached with respect to the image capturing apparatus 500.

The image processing unit 511 receives the pixel signal from the drive control unit 420 of the image capturing device 100. The image processing unit 511 performs various types of image processing by using the work memory 504 as a work space, and generates the image data. For example, the image processing unit 511 detects feature points from a plurality of captured images, synthesizes the plurality of images based on the feature points, and generates final image data. In addition, when generating the image data in a JPEG file format, the image processing unit 511 performs white balance processing, gamma processing, and the like, and then performs compression processing. The generated image data is recorded in the recording unit 505, and is converted into a display signal to be displayed on the display unit 506 for a preset time. It should be noted that the image processing unit 511 may be configured as an ASIC that is independent of the system control unit 501, or may be provided in the memory chip 112.

The image capture control unit 512 receives an output of the photometry unit 503 to calculate the luminance of each region of the scene. The image capture control unit 512 sets the exposure condition for each block 131 according to the luminance distribution of the scene. In addition, the image capture control unit 512 determines an opening and closing timing of a shutter according to the exposure condition set for each block 131.

The image capture control unit 512 of the present example changes a light receiving position on the image capturing device 100 based on the exposure condition set for each block 131. Here, changing the light receiving position on the image capturing device 100 refers to changing a position on the image capturing chip 113 that the incident light reaches via the photographing lens 520.

The image capture control unit 512 drives at least any of the image capturing device 100 or the photographing lens 520 by controlling the driving unit 502 to change the light receiving position on the image capturing device 100. The image capture control unit 512 may drive any one of the image capturing device 100 or the photographing lens 520, or may drive both. The setting of any of the image capturing device 100 or the photographing lens 520, as the drive target, may be performed according to a user input.

The image capture control unit 512 calculates an amount of the drive based on the exposure condition set for the adjacent block 131. A method of calculating the amount of the drive will be described below. Then, the image capture control unit 512 determines the number of times of the drive in an image capture period, drive timings, and a plurality of corresponding drive positions. Here, an exposure time is used as an example of the exposure condition. The number of times of the drive and the drive timings may be set based on the exposure time and the number of times of the image capture of the block 131 for which the shortest exposure time is set. The drive position may be determined based on the calculated amount of the drive and the number of times of the drive.

A mode selection unit 513 selects an image capture mode of the image capturing apparatus 500. Based on the exposure condition set for each block 131, the mode selection unit 513 selects any of a drive mode in which the light receiving position on the image capturing device 100 is changed, or a standard mode in which the light receiving position on the image capturing device 100 is not changed. The mode selection unit 513 may select the drive mode when a difference between values in relation to the exposure times set for the adjacent blocks exceeds a threshold value, and select the standard mode when the difference is less than or equal to the threshold value.

When the standard mode is selected, the image capture control unit 512 delivers the exposure condition set for each block 131 to the drive control unit 420. The drive control unit 420 controls the sensor control unit 441 to expose each pixel according to the acquired exposure condition. On the other hand, when the drive mode is selected, the image capture control unit 512 delivers, to the drive control unit 420, the exposure condition set for each block 131 and drive information indicating the drive position and the drive timing. The drive control unit 420 controls the sensor control unit 441 to expose each pixel according to the exposure condition, while changing the light receiving position on the image capturing device 100 according to the drive information.

It should be noted that the mode selection unit 513 may be a part of the image capture control unit 512. Alternatively, the image capture control unit 512 and the mode selection unit 513 may be provided in the memory chip 112. In this case, the image capture control unit 512 and the mode selection unit 513 receive the information from the system control unit 501, and transfer the result of the calculation based on the received information, to the drive control unit 420.

Figure 7:
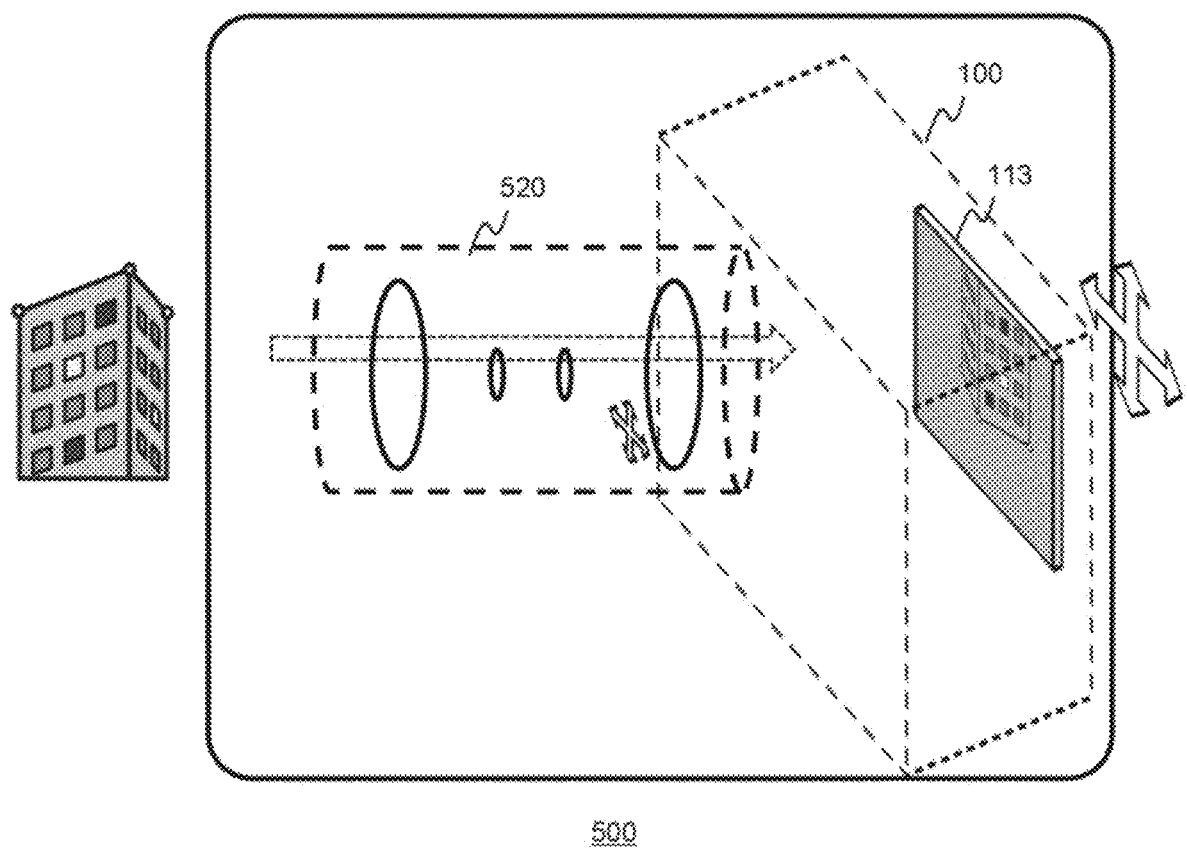
FIG. 7 is a conceptual diagram of a drive mode.

FIG. 7 is a conceptual diagram of a drive mode. As an example, a case where the image capturing device 100 is driven from a drive position 0 to drive positions 1 to N at drive timings 1 to N, will be described. It should be noted that even in a case where the photographing lens 520 is driven to the drive positions 1 to N, similarly to the case where the image capturing device 100 is driven, an effect of changing the light receiving position on the image capturing device 100 is obtained, and thus the description thereof is omitted.

The drive position 0 is a reference position where the image capturing device 100 is positioned at the start of the image capture, and the drive positions 1 to N are points on the same plane as the xy plane where the image capturing device 100 is positioned at the drive position 0. That is, the drive positions 1 to N are relative positions of the image capturing device 100 with the drive position 0 as a reference. At the drive timing 1, the image capturing device 100 moves from the drive position 0 to the drive position 1, and at the drive timing 2, the image capturing device 100 moves to the next drive position 2. In this way, the drive is repeated N times until the end of the image capture, and the image capturing device 100 moves from the drive position 0 to the drive position N in order.

In this way, the position of the image capturing device 100 changes at each drive timing, and thus the light receiving position on the image capturing device 100 also changes relatively. For example, when the light receiving position at the drive position 0 is a pixel near a boundary of a certain block 131, the light receiving position at a certain drive position may be a pixel within the adjacent block 131.

Figure 8A:
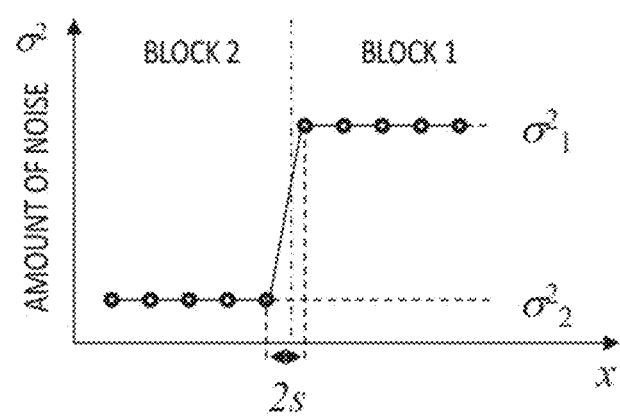
FIG. 8A is a conceptual diagram showing a slope of an amount of noise at a block boundary.

FIG. 8A is a conceptual diagram showing a slope of an amount of noise at a block boundary. The noise generated during the exposure affects an image quality. The amount of the noise generated in each pixel mainly depends on the number of times of the image capture during the image capture period, and thus can be estimated in advance from the exposure condition set for the block 131 to which the pixel belongs.

In FIG. 8A, a horizontal axis is the position of the image capturing chip 113 in an x axis direction, and a vertical axis is the amount of the noise $\sigma^2$ which is generated in the pixel. In a block 1 and a block 2 which are adjacent to each other in the x axis direction among the blocks 131, the amount of the noise which is generated in each pixel is set to $\sigma^2_1$ and $\sigma^2_2$, respectively. In each block 131, the exposure condition which is set for the pixels is identical, and thus $\sigma^2_1$ and $\sigma^2_2$ are respectively constant.

Here, with a boundary between the block 1 and the block 2 as the center, a range of a distance s in a positive direction of the x axis and a distance of s in a negative direction, that is a range of a distance 2s, is set as a block boundary region. When the image capturing device 100 is not driven, the distance 2s is a minimum distance between the pixel in the block 1 and the pixel in the block 2, that is, a distance between the centers of the pixel in the block 1 and the pixel in the block 2 that are in contact with each other at the boundary of both blocks. At this time, a slope k of the amount of the noise in the block boundary region is given by the following expression.

$$k = \frac{|\sigma^2_1 - \sigma^2_2|}{2s} \quad \text{(Math. 1)}$$

From the expression described above, it can be seen that when the distance 2s is constant, the greater the difference between the amounts of the noise $\sigma^2_1$ and the noise $\sigma^2_2$ of the adjacent blocks, the greater the slope k at the block boundary. When the slope k is great, there is a possibility that the block boundary on the image stands out for the image quality to deteriorate. It should be noted that the "block boundary of the image capturing device 100" means the boundary between the adjacent blocks 131 in the image capturing device 100, and the block boundary on the image means the boundary between the regions on the images respectively corresponding to the adjacent blocks of the image capturing device 100.

The image capture control unit 512 changes the light receiving position in the image capturing device 100 by driving the image capturing device 100 during the image capture. The image capture control unit 512 determines the amount of the drive of the image capturing device 100 according to the difference between the exposure times set for the adjacent blocks. The image capture control unit 512 calculates a target drive distance $s_{target}$ of each block 131 in determining the amount of the drive of the image capturing device 100. When a threshold value of the slope k is set as $K_{threshold}$, the target drive distance $s_{target}$ is given by the following expression.

$$k \leq K_{threshold} \quad \text{(Math. 2)}$$
$$s_{target} = \frac{|\sigma^2_1 - \sigma^2_2|}{2K_{threshold}}$$

Here, the threshold value $K_{threshold}$ of the slope k is a possible maximum value of the slope k, and may be a predetermined value. The target drive distance $s_{target}$ is a target value of the distance between the drive position 0 and each drive position, and is a drive range of the image capturing device 100 which is required for the slope k to be less than or equal to the threshold value $K_{threshold}$. The image capture control unit 512 may set the plurality of drive positions within a range from the drive position 0 to a maximum value of the target drive distance $s_{target}$ calculated for each block 131.

In addition, the image capture control unit 512 determines the drive position such that the amount of the drive in the exposure time of the block 131 for which the longest exposure time is set, is less than or equal to a size of one pixel. The amount of the drive is a movement distance when the image capturing device 100 is driven from a certain drive position to another drive position. The size of a pixel is a length of a side of one pixel in the x axis direction or a y axis direction on the xy plane where the image capturing chip 113 is positioned.

Figure 8B:
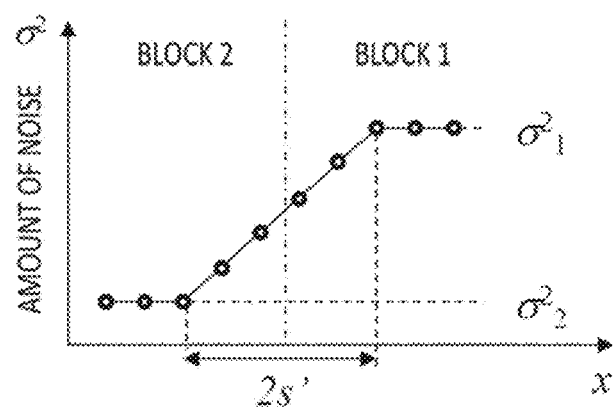
FIG. 8B is a conceptual diagram showing the slope of the amount of the noise at the block boundary when an image is captured in the drive mode.

FIG. 8B is a conceptual diagram showing the slope of the amount of the noise at the block boundary when an image is captured in the drive mode. For example, when the image capturing device 100 is driven in the positive direction and the negative direction of the x axis by a distance of s', the distance of the block boundary region becomes 2s'. In the block boundary region, the amount of the noise changes gently by the slope k within a range of $\sigma^2_2$ or more and $\sigma^2_1$ or less. In this way, by driving the image capturing device 100, the amount of the noise is evened out in the block boundary region, and the block boundary on the image does not stand out.

The maximum value of the target drive distance $s_{target}$ may be a predetermined value. By making the distance 2s' great, an effect that the slope k of the amount of the noise becomes small and the block boundary on the image does not stand out, may be obtained, on the other hand, there is the following problem when there is a significant difference in the brightness between the adjacent blocks 131.

For example, when the block 1 corresponds to a bright region and the block 2 corresponds to a dark region, the exposure time which is set for the block 1 is shorter than the exposure time which is set for the block 2. When the pixel which is positioned near the boundary with the block 2, among the pixels in the block 1, is driven from the drive position 0 to the position included in the block 2, the pixel receives weak incident light in the dark region for a short exposure time, and thus there is a possibility that the pixel signal cannot be generated correctly. Therefore, by setting the maximum value of the target drive distance $s_{target}$, it is possible to keep appropriateness of the exposure condition while making the slope k small. The target drive distance $s_{target}$ may be less than or equal to the length of the block 131 in the x axis direction or the y axis direction.

Figure 9:
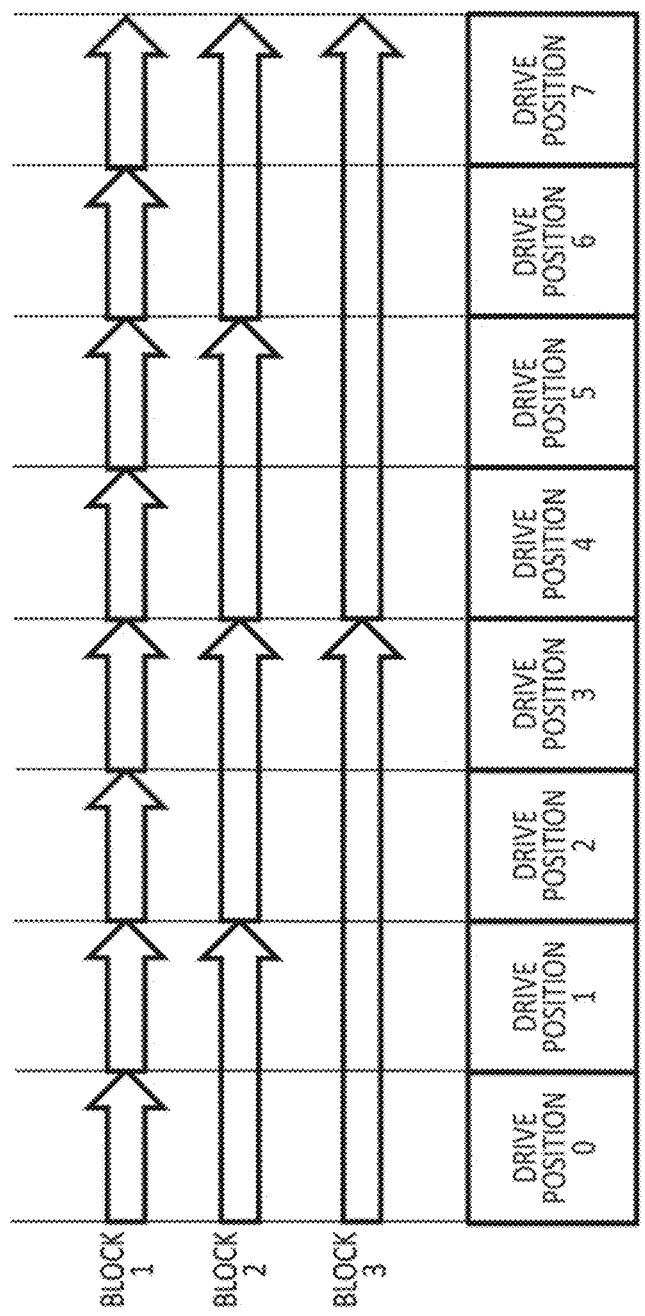
FIG. 9 is a conceptual diagram showing a relationship between an exposure time and a drive position.

FIG. 9 is a conceptual diagram showing a relationship between an exposure time and a drive position. In FIG. 9, the horizontal axis indicates a time axis. The block 1, the block 2, and a block 3 are examples of the block 131, and an outline arrow represents the exposure time and the drive timing of the corresponding block. The block 1 corresponds to the bright region, the block 3 corresponds to the dark region, and the block 2 corresponds to a region of intermediate brightness between the block 1 and the block 3. For the exposure time, the time is set to be shorter in order from the block 1 to the block 3.

The number of times of the image capture for each block is determined based on the exposure time of the block 3 for which the longest exposure time is set. In the example of FIG. 9, for the block 3, the number of times of the image capture is two because the exposure time is 1/2 of the image capture period. For the block 1, the number of times of the image capture is four times that of the block 3, that is, eight because the exposure time is 1/4 that of the block 3. Similarly, for the block 2, the number of times of the image capture is two times that of the block 3, that is, four because the exposure time is 2/1 that of the block 3.

The image capture control unit 512 determines the number of times of the drive and the drive timing based on the number of times of the image capture of the block 1. In the example of FIG. 9, the number of times of the drive is seven which is obtained by subtracting one from the number of times of the image capture for the block 1, and the drive timing is the same as an elapsed time of the exposure time of the block 1. The number of the drive positions is eight which is the same as the number of times of the image capture for the block 1, and the image capturing device 100 is driven, from the drive position 0 which is the initial position to the drive position 7, from the start to the end of the image capture.

The image capture control unit 512 determines the drive position such that the amount of the drive in the exposure time of the block 3 for which the longest exposure time is set, is less than or equal to the size of one pixel. In the example of FIG. 9, the image capturing device 100 is positioned at the drive positions 0 to 3 during the first image capture of the block 3, and thus the image capture control unit 512 determines the drive position such that the amount of the drive from the drive position 0 to the drive position 3 is less than or equal to the size of one pixel. Then, at the start of the second image capture for the block 3, the image capturing device 100 is driven to the drive position 4, but the amount of the drive from the drive position 0 to the drive position 4 may exceed the size of one pixel, and during the second image capture for the block 3, the image capturing device 100 is positioned at the drive positions 4 to 7, and thus the image capture control unit 512 determines the drive position such that the amount of the drive from the drive position 4 to the drive position 7 is less than or equal to the size of one pixel.

In the block 1, the drive timing is identical to the elapsed time of the exposure time; however, in the other blocks 2 and 3 for which the exposure times are set to be longer than that of the block 1, the drive timing arrives during the exposure. That is, the image capture control unit 512 drives the image capturing device 100 to the next drive position during the exposures of the pixels in the blocks 2 and 3. In this way, even for the block corresponding to the dark region, when the image capturing device 100 is driven, the exposure is not interrupted, and thus it is possible to receive a sufficient amount of the incident light and generate an accurate pixel signal.

In addition, the image capture control unit 512 may cause the number of the drive positions in one pixel to be greater than the number of times of the exposure for the block 1, and move the image capturing device 100 more finely. In addition, the image capture control unit 512 may create a drive route by connecting the plurality of drive positions, or set the drive route without setting the drive position, to continuously move the image capturing device 100 along the drive route. Even in such a case, the image capture control unit 512 determines the drive position such that the amount of the drive in the exposure time of the block 3 for which the longest exposure time is set, is less than or equal to the size of one pixel.

Alternatively, the image capture control unit 512 may determine the drive position to perform the image capture at the same position in the exposure time of the block 3 without driving the image capturing device 100 each time the exposure time of the block 1 elapses. In the example of FIG. 9, when the drive positions 1 to 4 are the same position, and the drive positions 5 to 7 are the same position, the image capturing device 100 is driven from the drive position 0 to the drive position 1 during the first image capture of the block 3, and is driven from the drive position 1 to the drive position 5 during the second image capture of the block 3. In this case, for the block 1, the second to fifth image captures are performed at the same drive position 1, and the sixth to eighth image captures are performed at the same drive position 5. The block 2 is driven from the drive position 0 to the drive position 1 during the first image capture, and then the image capture is performed at the drive position 1, the block 2 is driven to the drive position 5 during the third image capture, and then up to the fourth image capture is performed at the drive position 5.

Figure 10A:
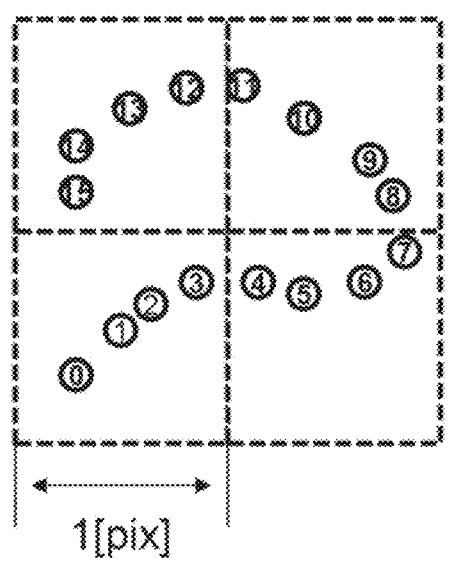
FIG. 10A shows an example of setting the drive position.

FIG. 10A shows an example of setting the drive position. FIG. 10A is an example of setting the drive position of the image capturing device 100 including the blocks 1 to 3 in the example of FIG. 9. The image capture control unit 512 calculates the amount of the drive of the image capturing device 100 from the exposure condition set for each block 131, and determines the number of times of the drive and the drive timing. The image capture control unit 512 determines the drive position corresponding to the number of times of the drive such that the distance from the drive position 0 is within the target drive distance $s_{target}$.

In the example of FIG. 10A, the number of the drive positions is 16, and the image capture control unit 512 determines the drive positions 1 to 15. Here, the time to be driven from the drive position 0 to the drive position 3 is equal to the exposure time of block 3. The image capture control unit 512 determines the drive positions 1 to 3 such that the movement distance from the drive position 0 to the drive position 3 does not exceed the size of the pixel.

Similarly, the image capture control unit 512 determines the drive positions 4 to 7 such that the movement distance from the drive position 4 to the drive position 7 does not exceed the size of the pixel. Further, the image capture control unit 512 determines the drive positions 8 to 11 and the drive positions 12 to 15, in a manner similar to the drive positions 1 to 3 and the drive positions 4 to 7, so that a last drive position 15 approaches the drive position 0, which should be noted.

In this way, by setting the amount of the drive in the exposure time of the block for which the longest exposure time is set, not to exceed the size of one pixel, it is possible to suppress image blur due to the drive.

Figure 10B:
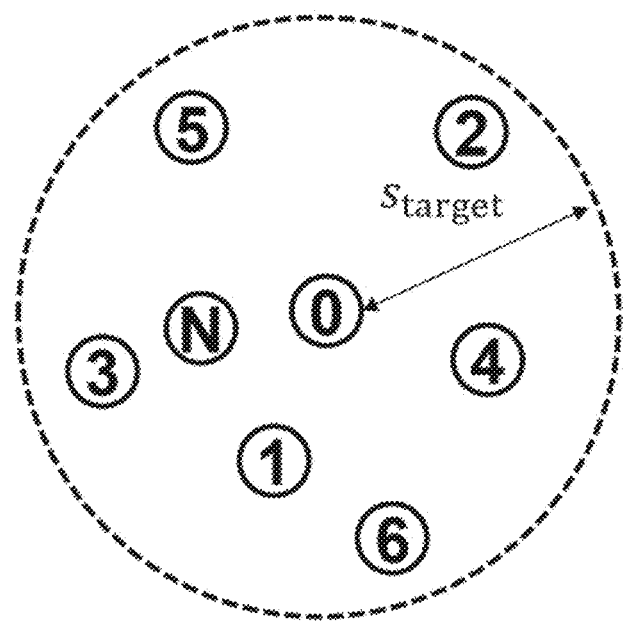
FIG. 10B shows an example of setting the drive position.

FIG. 10B shows another example of setting the drive position. In the example of FIG. 10B, the image capture control unit 512 determines the drive positions 1 to N such that an x coordinate of the drive position satisfies a normal distribution represented by an expression described in FIG. 10B and a y coordinate also similarly satisfies the normal distribution. In other words, the image capture control unit 512 may randomly determine the drive positions 1 to N within the range of the target drive distance $s_{target}$.

Figure 10C:
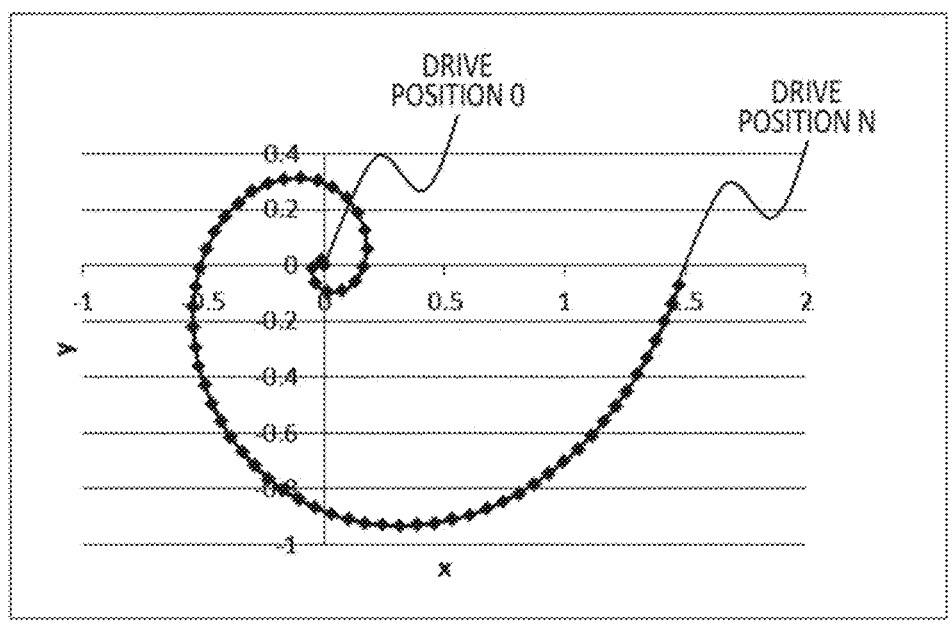
FIG. 10C shows an example of setting the drive position.

FIG. 10C shows another example of setting the drive position. In the example of FIG. 10C, the image capture control unit 512 determines the drive positions 1 to N to form a spiral shape. The image capturing device 100 is driven from the drive position 0 to the drive position N in the first image capture, and then may return, by the start of the second image capture, from the drive position n to the drive position 0 by the shortest path (in FIG. 10C, through on the x axis), or may be driven, in the second image capture, to the drive positions N, N−1, N−2, . . . , 1, 0, and driven in an opposite direction of that in the first image capture. In FIG. 10C, the distance on the x axis from the drive position 0 to the drive position N is the target drive distance $s_{target}$.

Figure 11A:
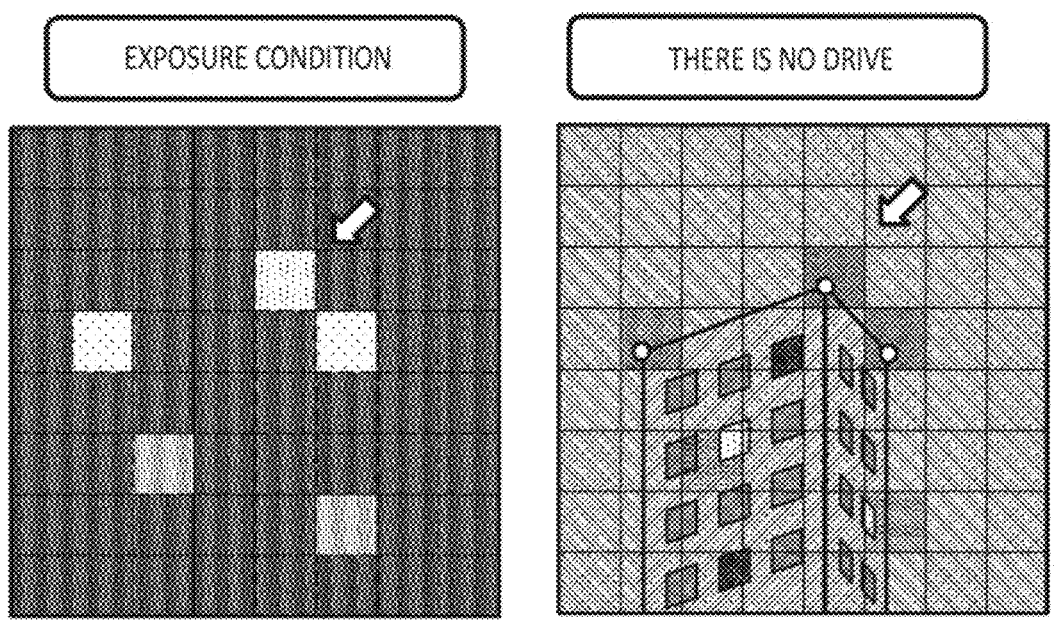
FIG. 11A is a diagram showing a specific example of an image captured according to an exposure condition.

FIG. 11A is a diagram showing a specific example of an image captured according to an exposure condition. In FIG. 11A, a diagram on a left side shows the exposure condition set for the image capture of a certain subject. The subject is a high-rise at night. The setting of the exposure time means that the brighter (close to white) a color of the block is, the shorter the exposure time is (a bright region), and the darker (closer to black) the color of the block is, the longer the exposure time is (a dark region). A block which is indicated by the arrow corresponds to a region including an aircraft warning light which is lit on a top floor of the high-rise which is the subject, is affected by the brightness of the aircraft warning light, and is set as a short second exposure block corresponding to the bright region. Any adjacent block corresponds to a region of the night sky (the dark region) for the subject, and is set as a long second exposure block.

In FIG. 11A, the diagram on a right side shows an image obtained as a result of the image capture without driving the image capturing device 100. The arrow indicates a region corresponding to the block of the aircraft warning light described above, and the block boundary on the image is an image which unnaturally stands out in the region corresponding to the night sky.

Figure 11B:
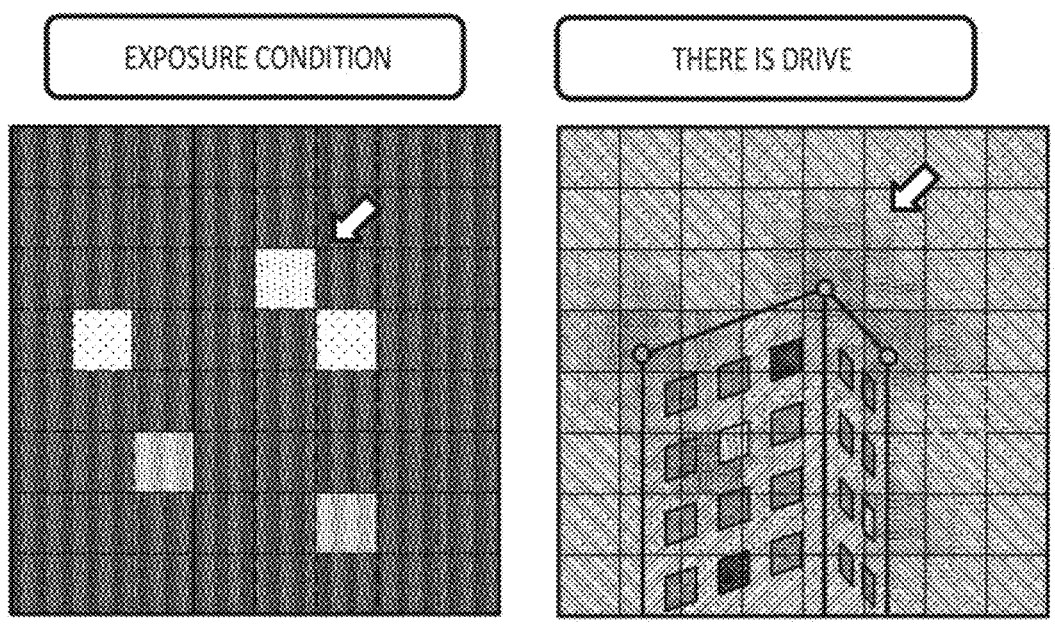
FIG. 11B is a diagram showing a specific example of an image in a case of being captured by driving the image capturing device 100 according to the same exposure condition as that in FIG. 11A.

FIG. 11B is a diagram showing a specific example of an image in a case of being captured by driving the image capturing device 100 according to the same exposure condition as that in FIG. 11A. It can be seen that as a result of the driving, the difference from the adjacent block in the amount of the noise is evened out, and a natural image in which the block boundary on the image does not stand out is obtained.

Figure 12:
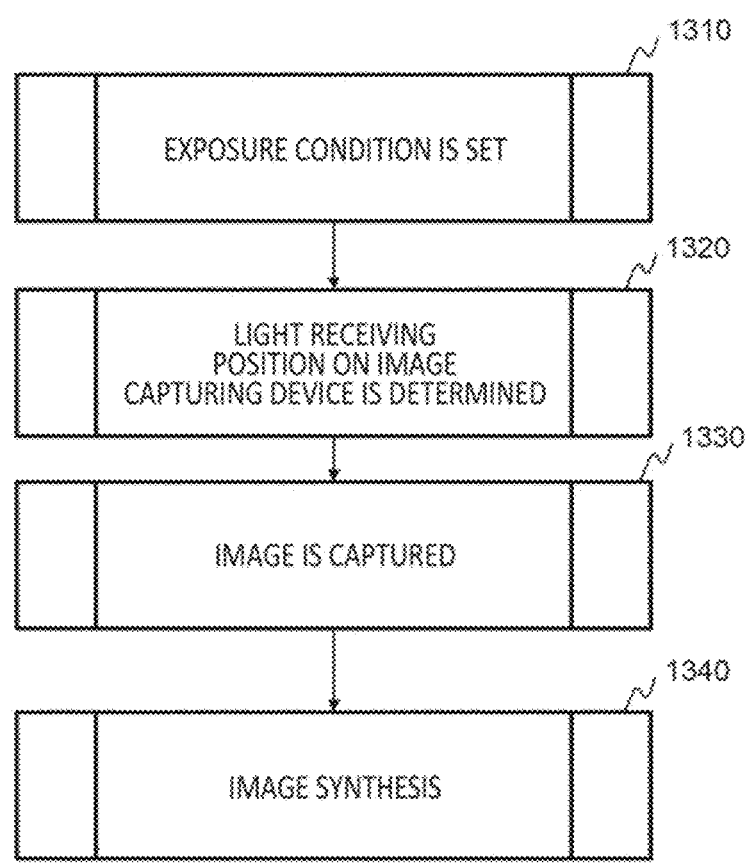
FIG. 12 is a flow diagram showing an example of an image capturing method according to the present embodiment.

FIG. 12 is a flow diagram showing an example of an image capturing method according to the present embodiment. Here, as an example, the image processing unit 511, the image capture control unit 512, or the mode selection unit 513 of the system control unit 501 will be described as a main operating component of the image capturing method; however, the present invention is not limited to this. Another functional block that is included in the image capturing apparatus 500 may be the main component.

In step S1310, the image capture control unit 512 sets the exposure condition for each block 131.

In step S1320, the image capture control unit 512 determines the exposure position on the image capturing device 100. The image capture control unit 512 calculates the amount of the noise or a signal-to-noise ratio (SN ratio) for each block 131 based on the exposure condition set for the adjacent block. In addition, the image capture control unit 512 calculates the difference in the amount of the noise or the difference in the SN ratio between the blocks 131 based on the amount of the noise or the SN ratio of each block 131, and based on this, determines the amount of the drive of the image capturing device 100.

The image capture control unit 512 may determine the amount of the drive in consideration of a camera shake correction. The image capture control unit 512 calculates an amount of a camera shake, and by subtracting the amount of the camera shake from the calculated amount of the drive, corrects the amount of the drive. For example, a measurement unit such as an acceleration sensor may be provided in the image capturing apparatus 500, and the amount of the camera shake may be measured by the measurement unit. In addition, when the image capturing apparatus 500 has an image stabilizer, the image capture control unit 512 may determine the amount of the drive in consideration of an amount of a movement for a vibration reduction by the image stabilizer. The image capture control unit 512 corrects the amount of the drive by subtracting, from the calculated amount of the drive, the amount of the movement by the image stabilizer. In this way, it is possible to perform the drive within a range of a more appropriate amount of the drive.

Before step S1320, the mode selection unit 513 may acquire the exposure condition from the image capture control unit 512, and select the image capture mode. The mode selection unit 513 may select the drive mode when a difference between values in relation to the exposure times set for the adjacent blocks exceeds a threshold value, and select the standard mode when the difference is less than or equal to the threshold value. When the drive mode is selected, processing may proceed to step S1320, and when the standard mode is selected, the processing may proceed to step S1330.

In step S1330, the image capture control unit 512 transmits the exposure condition, and the drive information indicating the drive position and the drive timing, to the drive control unit 420 of the image capturing device 100, and executes the image capture under the control of the drive control unit 420. Here, when the mode selection unit 513 selects the standard mode, the image capture control unit 512 may transmit only the exposure condition to the drive control unit 420.

The image processing unit 511 executes the synthesis and alignment of a plurality of images generated at a plurality of light receiving positions, and generate the image. The synthesis of the plurality of images may be performed by calculating a total value of pixel values of the respective pixels for which the images of the corresponding positions are captured, or may be performed by calculating an average value.

In this way, with the present example, it is possible for the block boundary on the image not to stand out.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

EXPLANATION OF REFERENCES

100: image capturing device, 101: microlens, 102: color filter, 103: passivation film, 104: PD, 105: transistor, 106: PD layer, 107: wiring, 108: wiring layer, 109: bump, 110: TSV, 111: signal processing chip, 112: memory chip, 113: image capturing chip, 131: block, 302: transfer transistor, 303: reset transistor, 304: amplification transistor, 305: selection transistor, 306: reset wiring, 307: TX wiring, 308: decoder wiring, 309: output wiring, 310: Vdd wiring, 311: load current source, 411: multiplexer, 412: signal processing circuit, 413: demultiplexer, 414: pixel memory, 415: arithmetic circuit, 420: drive control unit, 441: sensor control unit, 443: synchronization control unit, 444: signal control unit, 500: image capturing apparatus, 501: system control unit, 502: driving unit, 503: photometry unit, 504: work memory, 505: recording unit, 506: display unit, 511: image processing unit, 512: image capture control unit, 513: mode selection unit, 520: photographing lens.

What is claimed is:

1. An image capturing apparatus comprising:
an image capturing device that has a plurality of pixels outputting pixel signals according to incident light, the plurality of pixels being divided into a plurality of blocks each including at least two pixels, and an exposure condition being set for each block;
an image capture control unit that changes a light receiving position on the image capturing device, based on an exposure condition set for an adjacent block; and
an image processing unit that synthesizes a plurality of images which are generated at a plurality of the light receiving positions.

2. The image capturing apparatus according to claim 1, wherein
the image capture control unit determines an amount of a drive of the image capturing device based on the exposure condition set for the adjacent block, and drives the image capturing device based on the amount of the drive.

3. The image capturing apparatus according to claim 2, wherein
the image capture control unit determines the amount of the drive according to a difference between exposure times set for adjacent blocks.

4. The image capturing apparatus according to claim 3, wherein
the image capture control unit sets the amount of the drive based on a difference in noise between the adjacent blocks, and determines the plurality of light receiving positions within a range of the amount of the drive.

5. The image capturing apparatus according to claim 3, wherein
the amount of the drive in an exposure time of a block for which a longest exposure time is set, is less than or equal to a size of one pixel.

6. The image capturing apparatus according to claim 3, further comprising:
a mode selection unit that selects any of a drive mode in which the image capture control unit changes the light receiving position, or a standard mode in which the image capture control unit does not change the light receiving position, wherein
the mode selection unit selects the drive mode when a difference between values in relation to the exposure times set for the adjacent blocks exceeds a threshold value.

7. The image capturing apparatus according to claim 2, wherein
the image capture control unit sets the amount of the drive based on a difference in noise between the adjacent blocks, and determines the plurality of light receiving positions within a range of the amount of the drive.

8. The image capturing apparatus according to claim 7, wherein
the plurality of blocks includes a first block, and a second block for which an exposure time longer than that of the first block is set, and the image capture control unit changes, during an exposure of the second block, the light receiving position each time the exposure time of the first block elapses.

9. The image capturing apparatus according to claim 2, wherein
the amount of the drive in an exposure time of a block for which a longest exposure time is set, is less than or equal to a size of one pixel.

10. The image capturing apparatus according to claim 2, further comprising:
a mode selection unit that selects any of a drive mode in which the image capture control unit changes the light receiving position, or a standard mode in which the image capture control unit does not change the light receiving position, wherein
the mode selection unit selects the drive mode when a difference between values in relation to the exposure times set for the adjacent blocks exceeds a threshold value.

11. The image capturing apparatus according to claim 2, wherein
the image capture control unit corrects the amount of the drive by subtracting an amount of a camera shake.

12. The image capturing apparatus according to claim 1, further comprising:
an optical system that guides the incident light to the plurality of pixels, wherein
the image capture control unit determines an amount of a drive of the optical system based on the exposure condition set for the adjacent block, and drives the optical system based on the amount of the drive.

13. The image capturing apparatus according to claim 12, wherein
the image capture control unit determines the amount of the drive according to a difference between exposure times set for adjacent blocks.

14. The image capturing apparatus according to claim 13, wherein
the amount of the drive in an exposure time of a block for which a longest exposure time is set, is less than or equal to a size of one pixel.

15. The image capturing apparatus according to claim 13, further comprising:
a mode selection unit that selects any of a drive mode in which the image capture control unit changes the light receiving position, or a standard mode in which the image capture control unit does not change the light receiving position, wherein
the mode selection unit selects the drive mode when a difference between values in relation to the exposure times set for the adjacent blocks exceeds a threshold value.

16. The image capturing apparatus according to claim 12, wherein
the image capture control unit sets the amount of the drive based on a difference in noise between the adjacent blocks, and determines the plurality of light receiving positions within a range of the amount of the drive.

17. The image capturing apparatus according to claim 12, wherein
the amount of the drive in an exposure time of a block for which a longest exposure time is set, is less than or equal to a size of one pixel.

18. The image capturing apparatus according to claim 12, further comprising:
a mode selection unit that selects any of a drive mode in which the image capture control unit changes the light receiving position, or a standard mode in which the image capture control unit does not change the light receiving position, wherein the mode selection unit selects the drive mode when a difference between values in relation to the exposure times set for the adjacent blocks exceeds a threshold value.

19. The image capturing apparatus according to claim 12, wherein the image capture control unit corrects the amount of the drive by subtracting an amount of a camera shake.

20. An image capturing method that uses an image capturing device that has a plurality of pixels outputting pixel signals according to incident light, the plurality of pixels being divided into a plurality of blocks each including at least two pixels, and an exposure condition being set for each block, the image capturing method comprising:

changing a light receiving position on the image capturing device, based on an exposure condition set for an adjacent block; and synthesizing a plurality of images which are generated at a plurality of the light receiving positions.

\* \* \* \* \*